United States Patent [19]

Kobayashi et al.

[11] 4,395,741
[45] Jul. 26, 1983

[54] POSITIONABLE ELEMENT DRIVING CIRCUIT

[75] Inventors: Masaaki Kobayashi, Kawanishi; Kouichi Igata, Hirakata; Akihiro Takeuchi, Ikoma, all of Japan

[73] Assignee: Matsushita Electric Industrial Co., Ltd., Osaka, Japan

[21] Appl. No.: 226,172

[22] Filed: Jan. 16, 1981

[30] Foreign Application Priority Data

Jan. 19, 1980 [JP] Japan .................................. 55-4815

[51] Int. Cl.³ ............................................. G11B 21/10
[52] U.S. Cl. .................................. 360/77; 310/317; 360/107
[58] Field of Search .................... 360/77, 70, 109, 107; 310/315, 317

[56] References Cited

U.S. PATENT DOCUMENTS

| | | | |
|---|---|---|---|
| 3,916,226 | 10/1975 | Knoll | 310/317 |
| 4,163,994 | 8/1979 | Sakamoto et al. | 360/77 |
| 4,172,265 | 10/1979 | Sakamoto et al. | 360/107 |
| 4,223,358 | 9/1980 | Kubota et al. | 360/77 |
| 4,255,771 | 3/1981 | Kubota | 360/77 |
| 4,259,605 | 3/1981 | Rijckaert | 310/317 |
| 4,282,535 | 8/1981 | Kern et al. | 310/317 |
| 4,295,172 | 10/1981 | Fukada | 360/77 |

Primary Examiner—Alfred H. Eddleman
Attorney, Agent, or Firm—Wenderoth, Lind & Ponack

[57] ABSTRACT

A positionable element driving circuit for driving a positionable element compensates the supplied voltage-position characteristics of a bimorph type piezoelectric element which is used in a track following type video tape recorder/reproducer and which displaces the position of a video head. The supplied voltage to the bimorph type piezoelectric element is generated by an operational circuit which detects the track position of the video head. The circuit of the present invention compensates for the non-linearity and maintains the track following when the video tape recorder/reproducer is switched from one mode to another, e.g. from a still motion mode to a quick motion mode.

3 Claims, 11 Drawing Figures

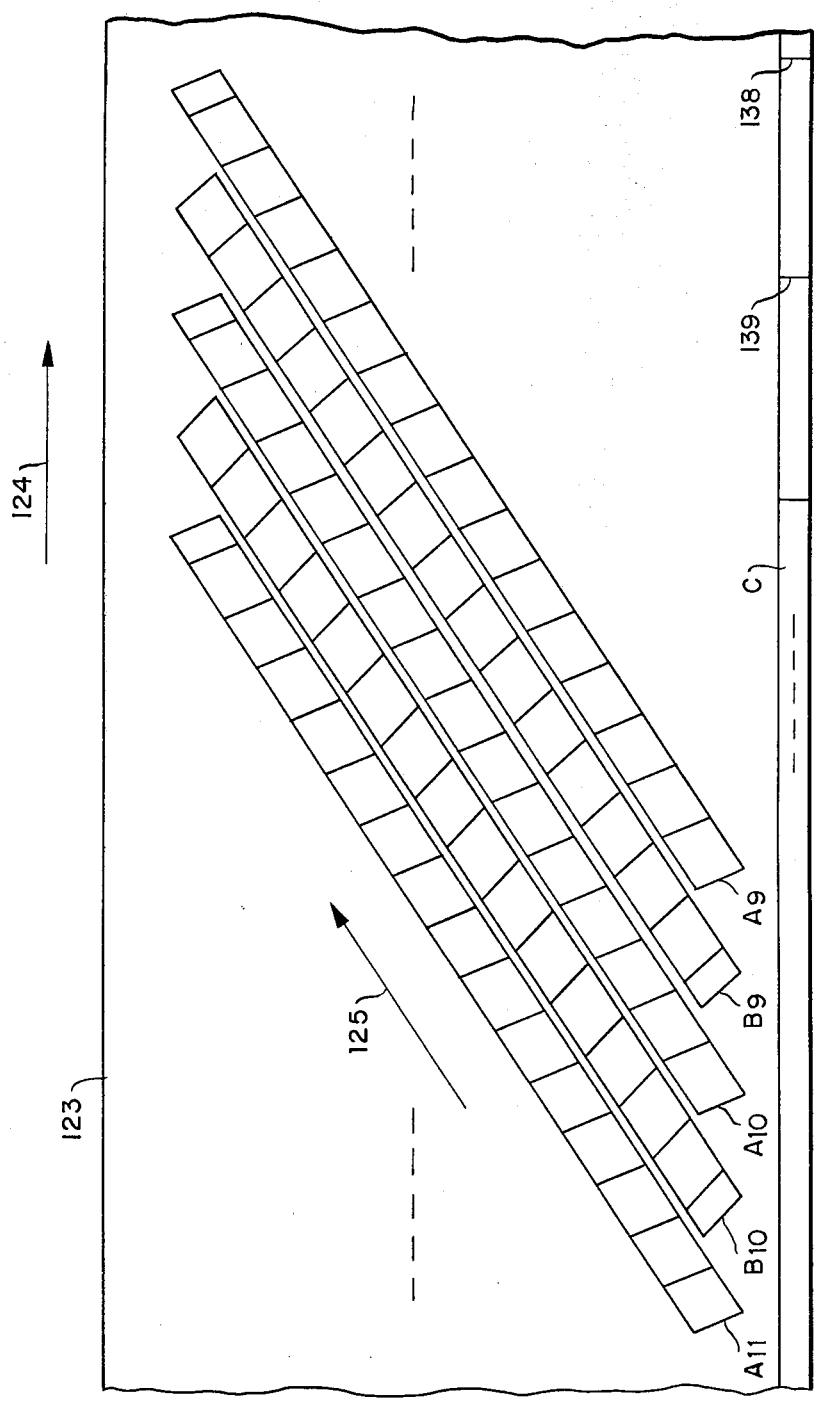

POSITIONABLE ELEMENT DRIVING CIRCUIT

BACKGROUND OF THE INVENTION

This invention generally relates to a positionable element driving circuit for driving a positionable element to control the position of video heads, such as a bimorph type piezoelectric element.

Recently, an automatic tracking system has been introduced to a video tape recorder/reproducer. Such a system makes possible a proper tracking of the video track recorded on a video tape, reproducing no noise band pictures at any tape speed mode, for example, a normal speed mode, a slow motion mode, a still motion mode, a quick motion mode, a reverse motion mode and so on.

In the conventional automatic tracking system, the video heads are mounted on positionable elements such as a piezoelectric element. The piezoelectric element is supplied with displacing pattern signals which are equivalent to the video tracks on the video tape, and the video heads can trace the video tracks.

But a bimorph type piezoelectric element has nonlinear supplied voltage-position characteristics, and the tracking is difficult when the displacing pattern signals are changed.

SUMMARY OF THE INVENTION

Accordingly, an object of this invention is to compensate for the non-linearity of a bimorph type piezoelectric element.

Another object of this invention is to enable the tracing of video tracks when the displacing pattern signals are changed with changes in the video tape transporting speed.

BRIEF DESCRIPTION OF THE DRAWINGS

FIG. 4 is a schematic drawing showing a video track pattern recorded on a magnetic tape;

DESCRIPTION OF THE PREFERRED EMBODIMENT

Now, a preferred embodiment of this invention will be described after the non-linearity of a bimorph type piezoelectric element is clarified as follows.

Figure 1:
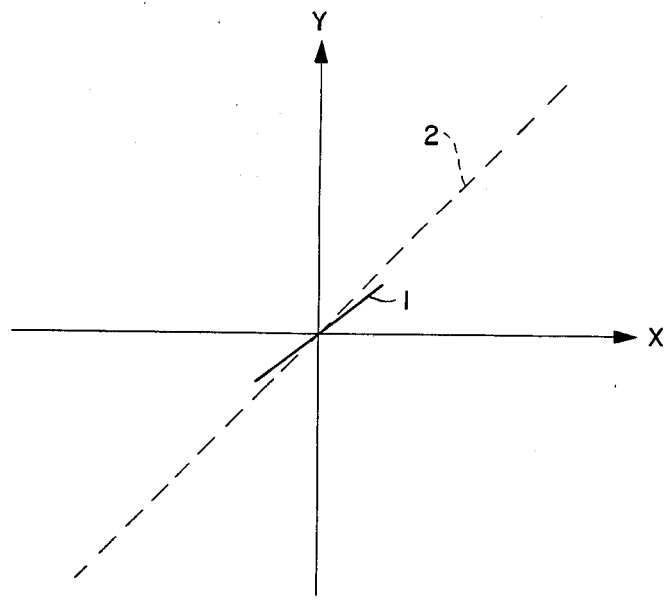
FIG. 1 is a graph showing the dynamic characteristics of a bimorph type piezoelectric element.
Figure 2:
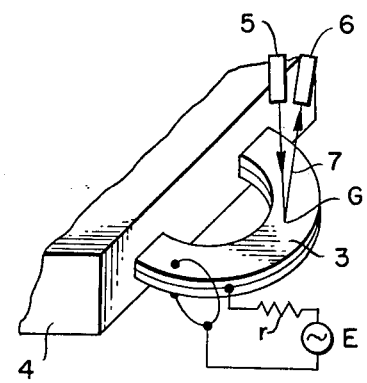
FIG. 2 is a schematic perspective view of a piezoelectric element and other elements used for measuring the dynamic characteristics of the piezoelectric element.

FIG. 1 shows dynamic characteristics of a bimorph type piezoelectric element or piezoelement. FIG. 2 shows a method of measuring the dynamic characteristics thereof. The shape of a piezoelement 3 is semicircular or arched. The piezoelement 3 is fixed to a block 4. The piezoelement 3 is supplied with a signal (voltage E) through a resistor r. The displacement of the unrestricted point G of the piezoelement 3 is measured without contact. The displacement is measured by the output signal level of an optical receiver 6. In FIG. 2, a light is radiated by a flood light projector 5 and is transmitted along arrow 7 and is reflected at the point G and is received by the optical receiver 6.

In FIG. 1, the supplied voltage E is plotted on the X axis and the output signal level is plotted on the Y axis. Using an oscilloscope, a Lissajous' figure is obtained. When a 30 Hz CW is supplied to the piezoelement 3, a Lissajous' FIG. 2 shown by a dotted line is obtained. As shown in FIG. 1, the gradient of the Lissajous' figures depends upon the supplied voltage. This is the non-linearity of a bimorph type piezoelement.

Figure 3:
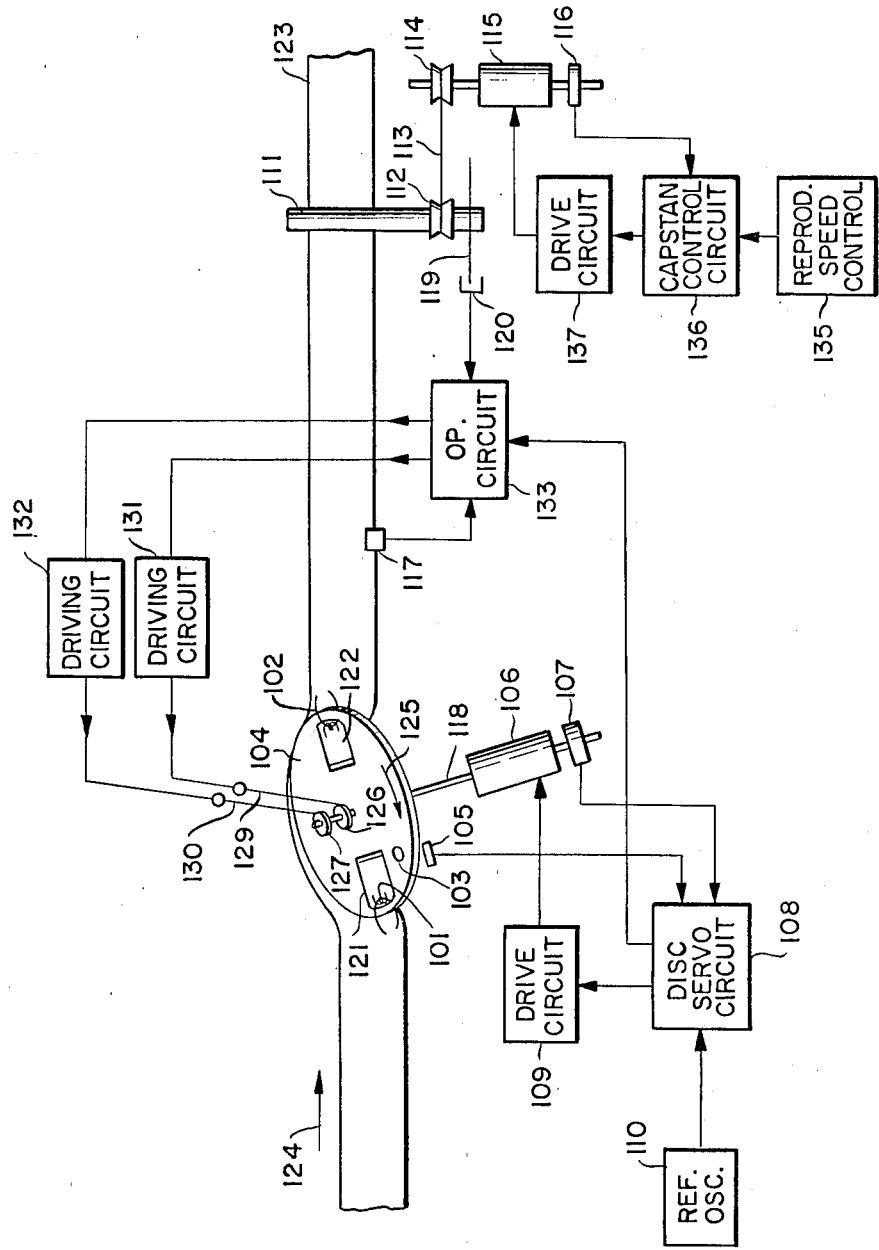
FIG. 3 is a schematic circuit diagram, in block form, of a video tape recorder including a positionable element driving circuit of this invention.

FIG. 3 shows a construction of a video tape recorder (reproducing mode) including a positionable element driving circuit of this invention. Video heads 101 and 102 have the same azimuth angular (for example 6°). The video heads 101 and 102 are mounted at the free end of positionable elements 121 and 122 (bimorph type piezoelectric elements). The other ends of elements 121 and 122 are fixed to a rotary disk 104. A magnet 103 indicates the rotating phase of the video heads 101 and 102 and is attached to the rotary disk 104. A rotating phase detector 105, which is coupled to the magnet 103, is attached to a fixed point. The rotary disk 104 is driven by a DC motor 106, and the rotating direction is indicated by the arrow 125.

The output signal of a frequency generator (FG) 107, which is mounted on a shaft of a DC motor 106, is supplied to a disk servo circuit 108. The output signals of the rotating phase detector 105 and a reference oscillator 110 are supplied to a disk servo circuit 108. The output signal of the disk servo circuit 108 is supplied to the DC motor 106 through a drive circuit 109. By these means, the rotating phase control of the rotary disk 104 is achieved. The magnetic tape 123 is driven by a capstan 111 and a pinchroller (not shown), and the driven direction is indicated by an arrow 124. The capstan 111 is driven by a DC motor 115 through a pulley 112, a belt 113, and a pulley 114. The output signal of a frequency generator (FG) 116 which indicates the rotation of the DC motor 115, and the output signal of a reproduction tape speed controller 135 is supplied to a capstan control circuit 136.

The output signal of a control head 117 (hereafter, this signal will be designated as a control signal R), the output signal of the rotating phase detector 120 and the output signal P of the disk servo circuit 108 are supplied to the operational circuit 133. The rotating angular speed of the capstan 111 is detected by the combination of a disk having a number of slits 119 which is attached to the capstan 111 and the rotating phase detector 120. The rotating phase detector 120 generates the pulse in proportion to the rotating angular speed of the capstan 111. For example, when the reproducing tape speed is the same as that at recording, an assumption is made that the rotating phase detector 120 is chosen so as to generate 10 pulses during one period between the successive reproduced control signal R. Since the rotating phase detector 120 generates the same 10 pulses regardless of the change of the reproducing tape speed, this means that a spacing period between the successive reproduced control signal R is divided into ten divisions effectively. Hereafter, the output pulses of the rotating phase detector 120 are called sub-control signals Q.

An embodiment of the rotating phase detector 120 described above is made up of a luminous body and a photo detector; the detector detects the light which passes through the slits on the disk 119, but similar output signals may also obtained by employing a toothed wheel made of a magnetic material in place of the slit disk 119 and a magnetic flux detector in place of the detector 120.

The output signal of the operational circuit 133, which is a displacement pattern, is supplied to the driving circuits 131 and 132, and amplified enough to drive the positionable elements 121 and 122. These amplified signals are supplied to the positionable elements 121 and 122 through conductive brushes 129 and 130, and slip rings 126 and 127. The slip rings are attached to a rotary shaft 118 of the DC motor 106, but are electrically insulated from the shaft 118.

FIG. 4 shows the video track pattern recorded on the magnetic tape 23. Elements $B_9$, $A_{10}$, $B_{10}$, $A_{11}$, $B_{11}$, and $A_{12}$ are one field of video tracks of video signals, $A_{10}$, $A_{11}$ and $A_{12}$ tracks are recorded by one video head whose azimuth is $+6°$. $B_9$, $B_{10}$ and $B_{11}$ tracks are recorded by another video head whose azimuth is $-6°$. Element C is the control track. The control signals, which represent the recording phase of the video signals, are recorded on the control track C at the rate of one control signal every one picture frame. In the recording process, the starting point of the $A_{10}$ track and the control signal 138 are recorded at the same time. The starting point of the $A_{11}$ track and the control signal 139 are recorded at the same time.

Figure 5:
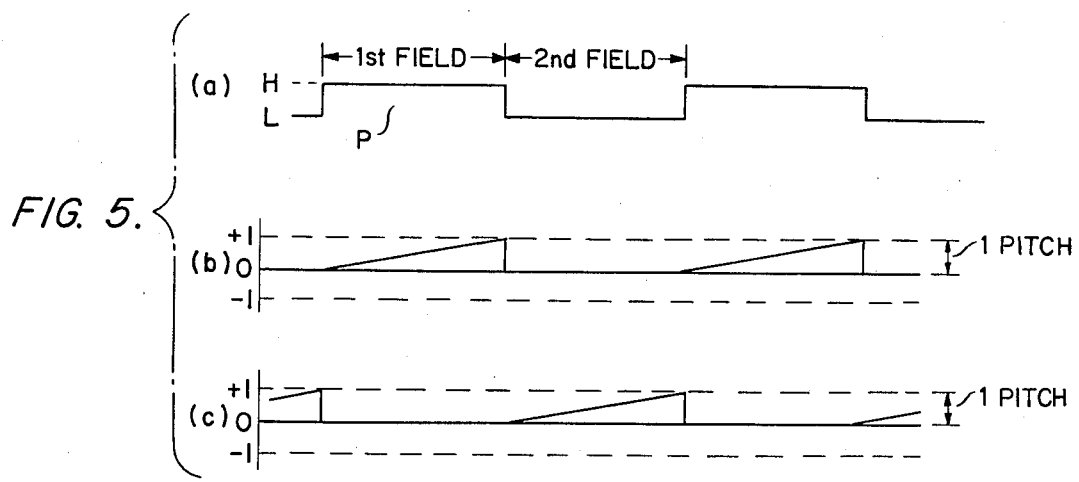
FIGS. 5 (a), (b) and (c) are graphs showing the waveforms of the input and output signals of an operational circuit.

In the reproducing process, when the video head 101 is scanning the starting point of the $A_{10}$ track, the control head 117 simultaneously reproduces the control signal 138. At that time, it is assumed that the transport magnetic tape 123 is stopped, then the trace end point of the video head 101 is the end point of the track $B_9$. This scanning period is called the first field. In order to reproduce pictures without a noise-bar, the video head 101 must trace the $A_{10}$ track with an on track condition from beginning to end. By supplying a voltage which increases linearly with scanning, as shown in FIG. 5 (b), to the piezoelectric element 121 during the first field, the position of the video head 101 is linearly moved with scanning, and the video head is capable of following the entire video track. This required movement is zero at the trace starting point of the $A_{10}$ track and is one track pitch at the trace end point. This pattern of movement is called the still pattern.

Figure 6:
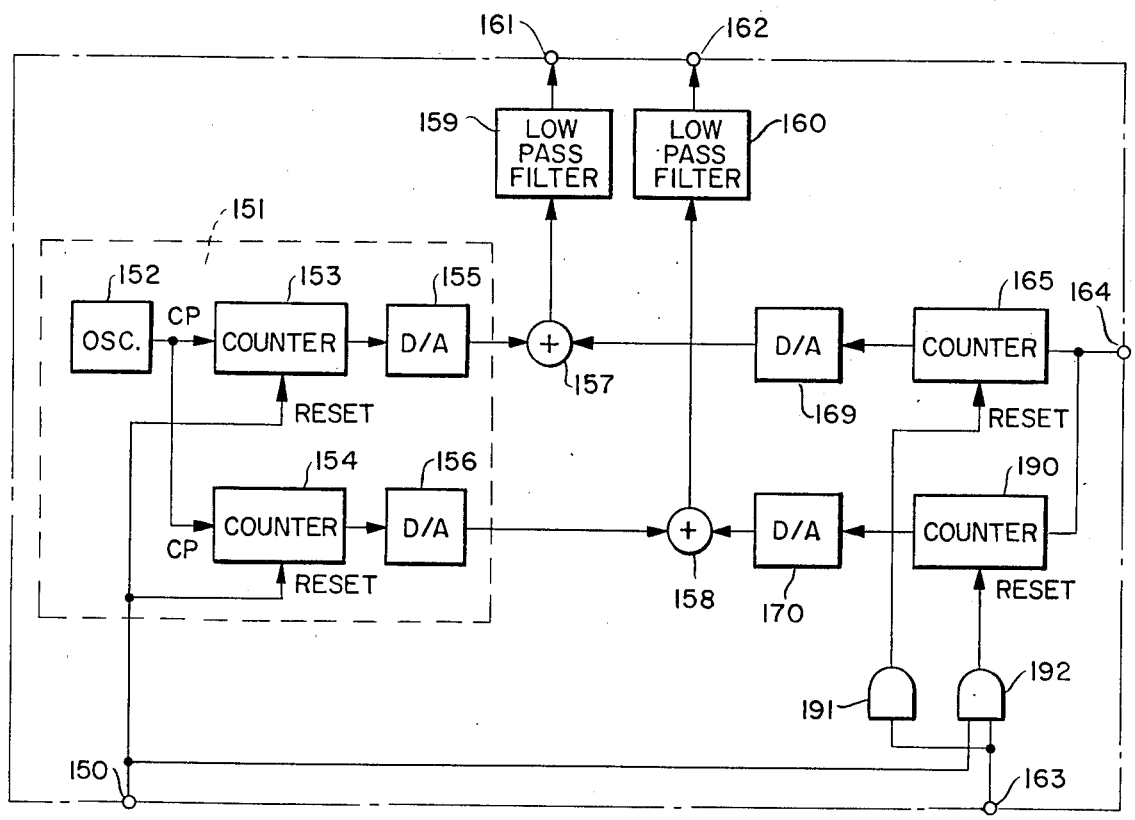
FIG. 6 is a schematic block diagram of the operational circuit.

The operational circuit 133 which generates the displacing pattern will hereafter be explained. In FIG. 3, the rotating phase of video head 101 is detected by the magnet 103 and the rotating phase detector 105. The rotating head phase signals are delayed by the disk servo circuit 108, and the signal P is obtained. The signal P has an H level (high level) at the first field as shown in FIG. 5 (a). The signal P is supplied to the operational circuit 133. A still pattern generator 151 which is part of the operational circuit 133 generates such a movement value using the signal P. An embodiment of the operational circuit 133 is shown in FIG. 6. In FIG. 6, the signal is supplied to the input terminal 150. The still pattern generator 151 consists of an oscillator 152, a counter 153, a counter 154, a D/A (digital-analog) converter 155, and a D/A converter 156. The control signal R which is reproduced from the control head 117 is supplied to the input terminal 163. The sub-control signal Q supplied from the rotating phase detector 120 is supplied to the input terminal 164. These input signals at the input terminals 150, 163, and 164 are supplied to the still pattern generator 151 and counters 165 and 190. Output signals are generated at output terminals 161 and 162 by a D/A converter 169, a D/A converter 170, an adder 157, an adder 158, the low pass filter 159 and the low pass filter 160.

Now, the performance of the operation circuit 133 at the still mode, will be explained. The oscillator 152 oscillates so as to provide 300 Hz pulse signals, for example. The output pulses of the oscillator 152 are supplied to the CP terminal of the counter 153. A reset terminal of the counter 153 is connected to the input terminal 150. The counter 153 is activated by an H level of the signal P and is reset by an L level (low-level) of the signal P. The output signals of the counter 153 are supplied to the output terminal 161 through the D/A converter 155, the adder 157 and the low pass filter 159.

The waveforms of the output signal are shown in FIG. 5(b). Since the frequency of the oscillator 152 is 300 Hz and the period of the first field is about 16.6 m sec., about five pulses are supplied to the counter 153 during the period. When the video head 101 scans the starting point of the $A_{10}$ track, the control signal 138 is reproduced and the magnetic tape 123 is stopped. At that time, since the counter 165 is reset by the control signal 138, the D/A converter 169 generates a zero level signal during the first field, and the adder 157 passes only the output signals of the D/A converter 155 as shown in FIG. 5(b). These signals are supplied to the piezoelectric element 121 through the driving circuit 131, the conductive brush 129 and the slip ring 126. Consequently, the video head 101 can trace the $A_{10}$ track with an on-track condition during the first field.

If the magnetic tape 123 remains stopped, the video head 102 begins to scan the $A_{10}$ track after the video head 101 scanned the $A_{10}$ track. The azimuth of the video head 102 is also $+6°$. If the output terminal 162 provides the signals shown in FIG. 5(c), then the video heads can scan the $A_{10}$ track with an on-track condition during the second field. The output signals are supplied to the piezoelectric element 122 through the driving circuit 132, the conductive brush 130 and the slip ring 127. In this case, the output pulses of the oscillator 152 are counted by the counter 154. The signal shown in FIG. 5(c) is transmitted to the output terminal 162 through the D/A converter 156, the adder 158 and the low pass filter 160. The counter 154 is activated by an L level of the signal P and is reset by an H level of the signal P. Since the magnetic tape 123 remains stopped, only the output signal of the D/A converter 156 is supplied to the adder 158. The signals as shown in FIG. 5(b) and in FIG. 5(c) are called the still pattern.

Figure 7:
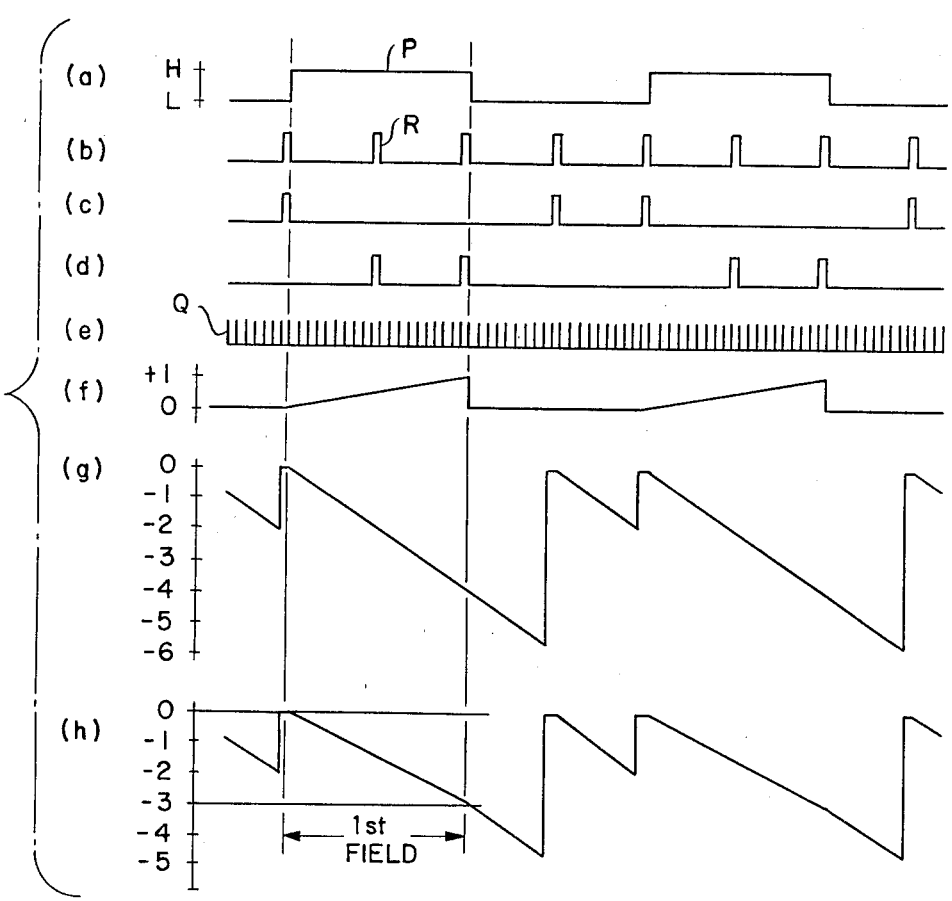
FIGS. 7 (a) to (h) are graphs showing the waveforms of various signals of the operational circuit.

Next, a case will be explained below, wherein the video recorder speed is four times the normal speed of playback. FIGS. 7(a), (b) and FIG. 7(e) show the phase relationships between the signal P and the control signal R and the sub-control signal Q. FIGS. 7(c) and (d) show the rest signals of the counters 165 and 190. When these signals are applied to the input terminals 150, 163 and 164, the signals shown in FIGS. 7(f) and (g) are provided at the output terminals of the D/A converters 155 and 169. The signal shown in FIG. 7(h) is supplied to the output terminal 161 through the adder 157 and the low pass filter 159.

As described above, during the still mode, the operational circuit 133 supplies to the driving circuit 131 a certain voltage corresponding to one video track. During the four times normal speed mode, the operational circuit 133 supplies a voltage which is three times as much as the supplied voltage during the still mode. If the characteristics of piezoelectric element 101 were linear, the driving circuit 131 would linearly amplify the output signal of the operational circuit 133.

Figure 8:
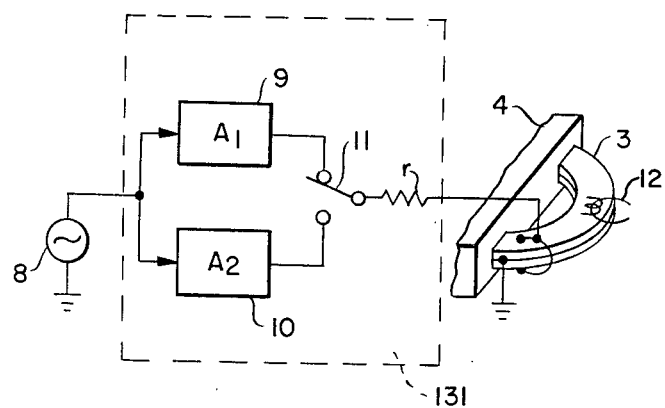
FIG. 8 is a schematic circuit diagram of an example of a driving circuit for driving the piezoelectric element.
Figure 9:
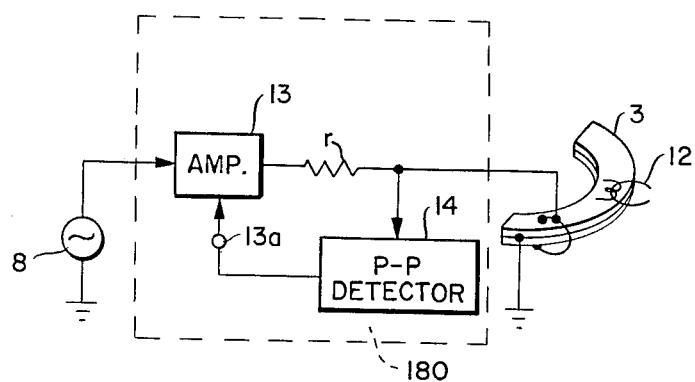
FIG. 9 is a schematic circuit diagram of another example of the driving circuit.

However, since the piezoelectric element 101 has non-linear characteristics, the driving circuit 131 is required to compensate for the non-linearity. FIG. 8 and FIG. 9 show such compensation. In FIG. 8, a signal source 8 represents the operational circuit 133. The piezoelectric element 3 corresponds to the piezoelement 121. The operational circuit 131 is constructed of an amplifier 9 whose gain is $A_1$, a further amplifier 10 whose gain is $A_2$, a switch 11 and a resistor (r). When the supplied peak-to-peak voltage of the piezoelement 3 is such as that shown by the solid line 1 in FIG. 1, the switch 11 connects the amplifier 9 to the resistor. This corresponds to the still mode. When the supplied peak-to-peak voltage of piezoelement 3 is such as that shown by the dotted line 2 in FIG. 1, the switch 11 connects the amplifier 10 to the resistor. This corresponds to the four times normal speed mode. The gains $A_1$ and $A_2$ are in inverse proportion to the gradient of the solid line 1 and the dotted line 2. Since the driving circuit 131 compensates for the non-linearity, the video head 12 can trace the video track.

In FIG. 9, a signal source 8 represents the operational circuit 133. A driving circuit 180 is another construction of the driving circuit 131. The driving circuit 180 is constructed by an amplifier 13, whose gain can be controlled, a resistor (r) and a peak-to-peak voltage detector 14. The gain of the amplifier 13 is in inverse proportion to the supplied voltage at the terminal 13a. The amplifier 13 is constructed of an FET or a photo coupler. The peak-to-peak voltage detector 14 is constructed of a conventional diode detector and a conventional time constant circuit. Since the driving circuit 180 compensates for the non-linearity, the video head 12 can trace the video track.

Figure 10:
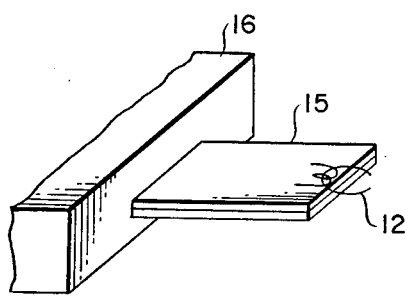
FIG. 10 is a schematic perspective view of another example of the piezoelectric element.
Figure 11:
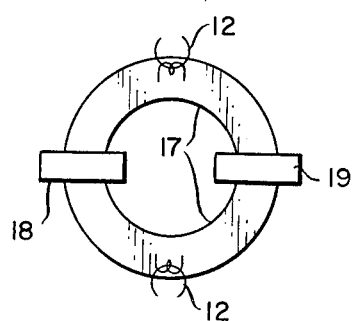
FIG. 11 is a schematic perspective view of yet another example of the piezoelectric element.

FIG. 10 and FIG. 11 show other types of piezoelectric elements. FIG. 10 shows a rectangular type piezoelement 15, while FIG. 11 shows a circular type piezoelement 17.

What is claimed is:

1. A positionable element driving circuit for supplying an AC driving voltage to a positionable element so as to alternatingly displace said positionable element, said driving circuit comprising: a displacing pattern signal source for supplying an AC displacing pattern signal; an amplifying means coupled to said displacing pattern signal source and supplied with said displacing pattern signal and having a gain for amplifying said displacing pattern signal by said gain; and a gain control means coupled to said amplifying means for controlling said gain of said amplifying means so as to make said gain correspond to a value which is inversely proportional to a gradient of a curve corresponding to said supplied voltage vs. a displaced position with respect to said positionable element, wherein said curve is defined by the relationship between said displaced position of said positionable element and the peak-to-peak voltage of said displacing pattern signal supplied directly to said positionable element.

2. A positionable element driving circuit according to claim 1, wherein said amplifying means comprises a plurality of amplifiers having a common input terminal coupled to said displacing pattern signal source and respectively having gains different from each other, and said gain control means comprises switching means having a plurality of input terminals which are respectively coupled to output terminals of said plurality of amplifiers and having one output terminal for feeding said displacing pattern signal to said output terminal of said switching means through one of said plurality of amplifiers by connecting one of said input terminals of said switching means to said output terminal of said switching means in correspondence with said peak-to-peak voltage of said displacing pattern signal.

3. A positionable element driving circuit according to claim 1, wherein said amplifying means is a controlled gain amplifier, and said gain control means comprises a peak-to-peak detector for controlling said gain of said controlled gain amplifier in response to said peak-to-peak voltage of said displacing pattern signal.

* * * * *